(12) United States Patent
Koarai

(10) Patent No.: US 7,410,206 B2
(45) Date of Patent: Aug. 12, 2008

(54) COMPONENT PARTS JOINING STRUCTURE

(75) Inventor: Manabu Koarai, Tokyo (JP)

(73) Assignee: Moriroku Company, Ltd., Tokyo (JP)

( * ) Notice: Subject to any disclaimer, the term of this patent is extended or adjusted under 35 U.S.C. 154(b) by 0 days.

(21) Appl. No.: 11/562,490

(22) Filed: Nov. 22, 2006

(65) Prior Publication Data

US 2007/0117456 A1 May 24, 2007

(30) Foreign Application Priority Data

Nov. 24, 2005 (JP) ............................. 2005-338824

(51) Int. Cl.
*B60R 27/00* (2006.01)

(52) U.S. Cl. ................ 296/187.01; 296/1.08; 296/39.1; 296/24.34; 403/204; 403/335; 403/373

(58) Field of Classification Search .................. 296/29, 296/39.1, 1.08, 24.34, 187.01; 403/204, 403/335, 373; 52/716.5–716.7, 718.01; 293/128
See application file for complete search history.

(56) References Cited

U.S. PATENT DOCUMENTS 2,751,109 A * 6/1956 Moore ......................... 220/688
4,153,290 A * 5/1979 Barenyi et al. ............... 296/191
4,940,354 A * 7/1990 Holderegger et al. ........... 403/5
6,308,488 B1 10/2001 Hoshino
6,824,201 B2 * 11/2004 Miyazaki ............... 296/193.06

FOREIGN PATENT DOCUMENTS

JP 2000-118318 4/2000

* cited by examiner

*Primary Examiner*—Dennis H Pedder
(74) *Attorney, Agent, or Firm*—Leydig, Voit & Mayer, Ltd.

(57) ABSTRACT

In a joining structure, a protruding portion on the side of a first component is a hollow body that prevents bringing about sinking, deforming, and cracking of the side surface of the first component part, even in the event that the protruding portion is enlarged in order to increase strength for connecting the first component part and a second component part. In addition, the connecting groove on the side of the second component part is also defined by a hollow body that includes a pair of supporting ribs and a supporting plate bridging the pair of supporting ribs. Consequently, the hollow body can prevent defects of sinking, deforming, and cracking in the side surface of the second component part, even in the event that the supporting ribs and the supporting plate are increased in thickness in order to enhance the rigidity of the coupling arrangement between the first and second component parts.

26 Claims, 7 Drawing Sheets

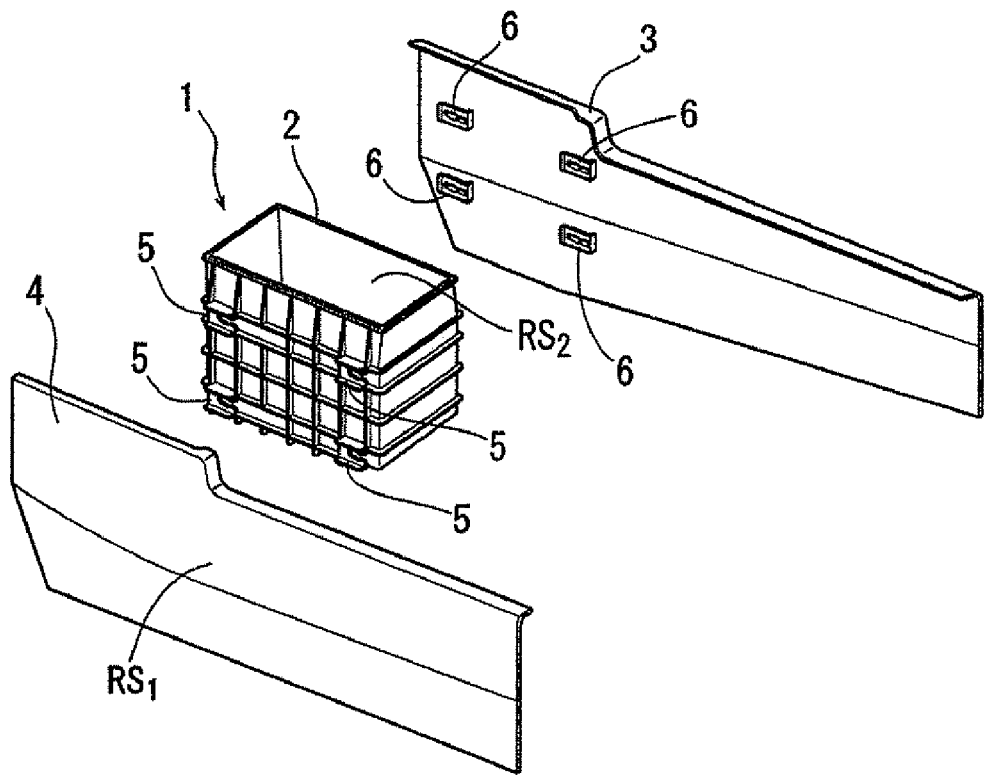
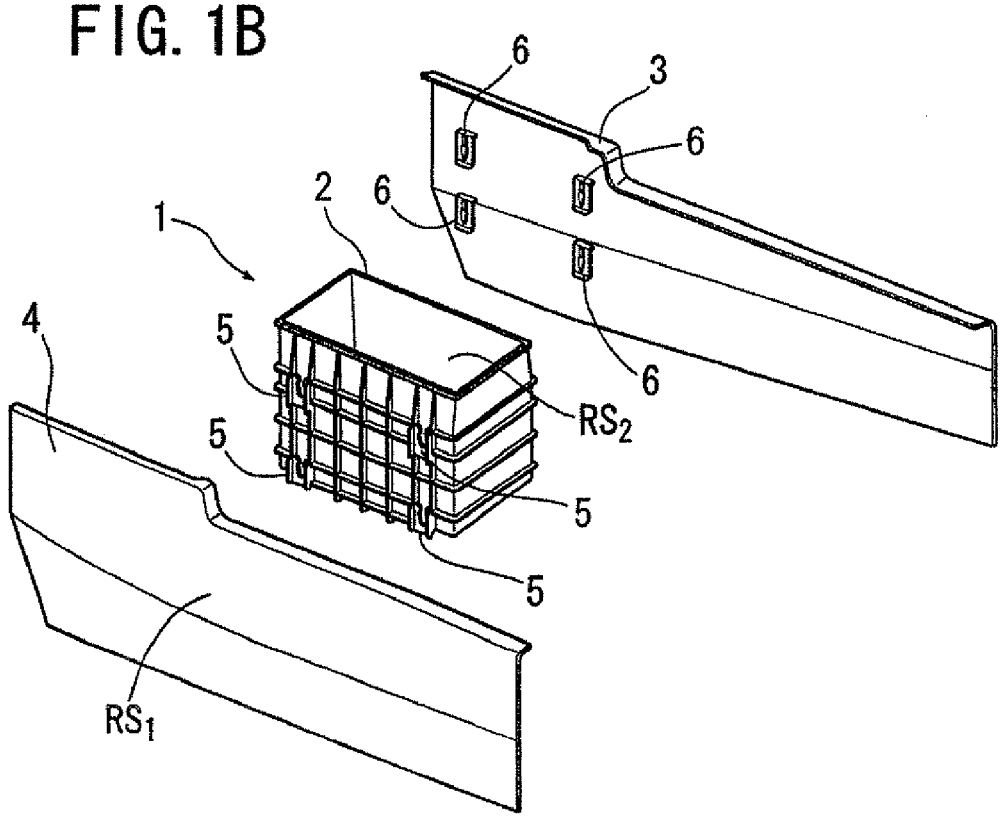

COMPONENT PARTS JOINING STRUCTURE

BACKGROUND OF THE INVENTION

1. Field of the Invention

The present invention relates to a joining structure for fitting parts or articles together, in particular, for use in the process of assembling component parts, such as interior parts of vehicles.

2. Description of the Related Art

In the production line of vehicles, it is repeatedly performed by workers to attach various kinds of interior parts such as console boxes and door linings to vehicle bodies. Those parts have to be infallibly attached in the predetermined positions. In addition, it is desirable to simplify and facilitate the work of attachment of the parts and to shorten the amount of time required for attaching the parts, especially when those parts are attached to mass-produced cars.

Japanese Patent Public Disclosure P2000-118318A discloses a structure for mounting a plate member on linings of a vehicle and a decorative component of a vehicle having the same structure. The plate mounting structure comprises a hook of a generally T-shaped cross section which is attached to a component part such as a door liner pad, a pair of stick-like guides formed on the hook or a substrate plate coalesced into the hook, and a hole formed in a member such as a door trim board. The hook of a T-shaped cross section has a head portion extending horizontally and a leg portion extending vertically. In addition, the pair of stick-like guides extend in parallel with the head portion of the hook. On the door trim board, a pair of protruding portions are formed beside the hole and a recess or slit is formed between the protruding portions to receive the leg portion of the hook therein. When mounting a decorative component such as the door liner pad on the door trim board, the head portion of the hook is inserted into the hole of the door trim board and then the hook is slid toward the protruding portions in order that the leg portion of the hook enter the recess or slit between the protruding portions. Thereby, the head portion of the hook is brought into contact with the upper surfaces of the protruding portions, while the pair of stick-like guides are brought into contact with the lower surfaces of the protruding portions. As a result, the protruding portions are wedged between the head portion and the stick-like guides so that the door liner pad of a decorative component is mounted on the door trim board of a vehicle.

The plate mounting structure disclosed in P2000-118318A has a structure that the head portion of the hook and the pair of protruding portions are interlocked to fix the door liner pad onto the door trim board. In order to enhance rigidity of the coupling arrangement between the door liner pad and the door trim board, it is, therefore, necessary to increase the thickness of the junction between the head and leg portions of the hook. In the event that the hook is molded from a synthetic resin and the thickness of the junction is increased, however, there is the possibility that a recess or so-called sink, a deformation or a crack is produced in the upper surface of the head portion when the junction between the head and leg portions are cooled down. If the sink, deformation and/or crack is formed in the upper surface of the head portion, the head portion has to be covered by another part to prevent the sink, deformation and crack from being exposed to the cabin of a vehicle. The sink, deformation and/or crack may be also formed in one side of the substrate plate, when the hook and the substrate plate was integrally molded from a synthetic resin and the leg portion of the hook coalesced into the other side of the substrate plate. In this case, it is also necessary to cover the defects on the side surface of the substrate plate by another means when the defected surface of the substrate plate is exposed to the interior of a cabin.

In addition, the plate mounting structure disclosed in Japanese Patent Public Disclosure P2000-118318A has a hole put through a member such as a door trim board, into which the head portion of the hook is inserted. The hole is left open after the head portion of the hook and the pair of protruding portions were interlocked to fix the door liner pad onto the door trim board. Therefore, the plate mounting structure cannot be used in the state that the member having the hole appears on the outside.

Furthermore, in order to fix the door liner pad onto the door trim board, the plate mounting structure mentioned above requires the following two steps of: inserting the head portion of the hook into the hole; and sliding the hook toward the protruding portions. The direction of inserting the head portion is at a right angle to the direction of sliding the hook. Consequently, the two steps have to be carried out as a discontinuous action. Therefore, the mounting work required for the plate mounting structure is not always efficient.

SUMMARY OF THE INVENTION

The objective of the present invention is to provide a joining structure of component parts that facilitates the coupling of component parts and simplifies the connecting activities of parts.

Another objective of the present invention is to provide a joining structure of component parts that can fix a component part onto another part quickly.

Further objective of the present invention is to provide a joining structure of component parts that generates a sufficient strength of connecting component parts.

Further objective of the present invention is to provide a joining structure of component parts, wherein the connected parts joined by the joining structure can be used as a product or a part of a product without any further processing of the product.

In order to achieve the aforementioned objects, a joining structure as a first aspect of the present invention comprises:

a first component part having a hollow protruding portion projecting from the side surface of said first component part, a flange portion projecting from the outer periphery of said hollow protruding portion with leaving a space from the side of said first component part, and an abutting surface formed on said flange portion to be opposed to the side surface of said first component part;

a second component part having a connecting groove for receiving said flange portion therein, said connecting groove extending along the side surface of said second component part and comprising a side slot for inserting said flange portion into said connecting groove, an upper slot for receiving said hollow protruding portion therein, and a bearing surface to be engaged with said abutting surface; and one or more strut portions formed on said first and/or second component parts, wherein said strut portions are compressed between said first and second component parts when said flange portion is inserted into said connecting groove, and whereby said abutting surface and said bearing surface are clamped together by the force exerted by said strut portions.

A joining structure as a second aspect of the present invention comprises:

a first component part having a hollow protruding portion projecting from the side surface of said first component part, a flange portion projecting from the outer periphery of said hollow protruding portion with leaving a space from the side of said first component part, an abutting surface formed on said flange portion to be opposed to the side surface of said first component part, and one or more latch portions formed on the side edges of said flange portion;

a second component part having a connecting groove (23) for receiving said flange portion therein, said connecting groove extending along the side surface of said second component part and comprising a side slot for inserting said flange portion into said connecting groove, an upper slot for receiving said hollow protruding portion therein, a bearing surface to be engaged with said abutting surface, and one or more intermediate slots for receiving said latch portions; and one or more strut portions formed on said first and/or second component parts, wherein said strut portions are compressed between said first and second component parts when said flange portion is inserted into said connecting groove, and whereby said abutting surface and said bearing surface are clamped together by the force exerted by said strut portions.

In the specification, the term of "hollow" means that the interior of an item, part or member is not filled with a material which makes up the item, and it does not matter whether an interior space of the item is closed or not. Similarly, the terms of "a hollow body" used in the specification means an item whose interior is not filled with a material which makes up the item, and it does not matter whether an interior space of the item is closed or not.

In the joining structure of the present invention, the protruding portion formed on the side of a first component part takes the form of a hollow body that prevents bringing about sinking, deforming and cracking of the side surface of the first component part, even in the event that the protruding portion is enlarged in order to increase the strength for connecting the first component part and a second component part. In addition, the connecting groove formed on the side of the second component part is also defined by a hollow body that comprises a pair of supporting ribs and a supporting plate bridging the pair of supporting ribs. Consequently, the hollow body can prevent generating the defects of sinking, deforming and cracking in the side surface of the second component part, even in the event that the supporting ribs and the supporting plate are increased in thickness in order to enhance the rigidity of the coupling arrangement between the first and second component parts.

Furthermore, no opening exists on the product surfaces of the first and second component parts to be joined together. Therefore, the joined parts can be used as a product or a part of a product without any further processing of the product.

In addition, the first and second component parts can be joined by inserting a flange portion of the first component part into the connecting groove of the second component part only in one direction. Therefore, the parts can be joined quickly and easily.

These and other advantages or effectiveness of the present invention will be defined from the detailed description of the present invention, which is made with reference to the accompanied drawings.

BRIEF DESCRIPTION OF THE DRAWINGS

FIG. 1A is an exploded perspective view of an automotive console assembly having a joining structure of a type in which joining is effected in a horizontal direction;

FIG. 1B is an exploded perspective view of an automotive console assembly having a joining structure of a type in which joining is effected in a vertical direction;

DETAILED DESCRIPTION OF THE PREFERRED EMBODIMENTS

Figure 2:
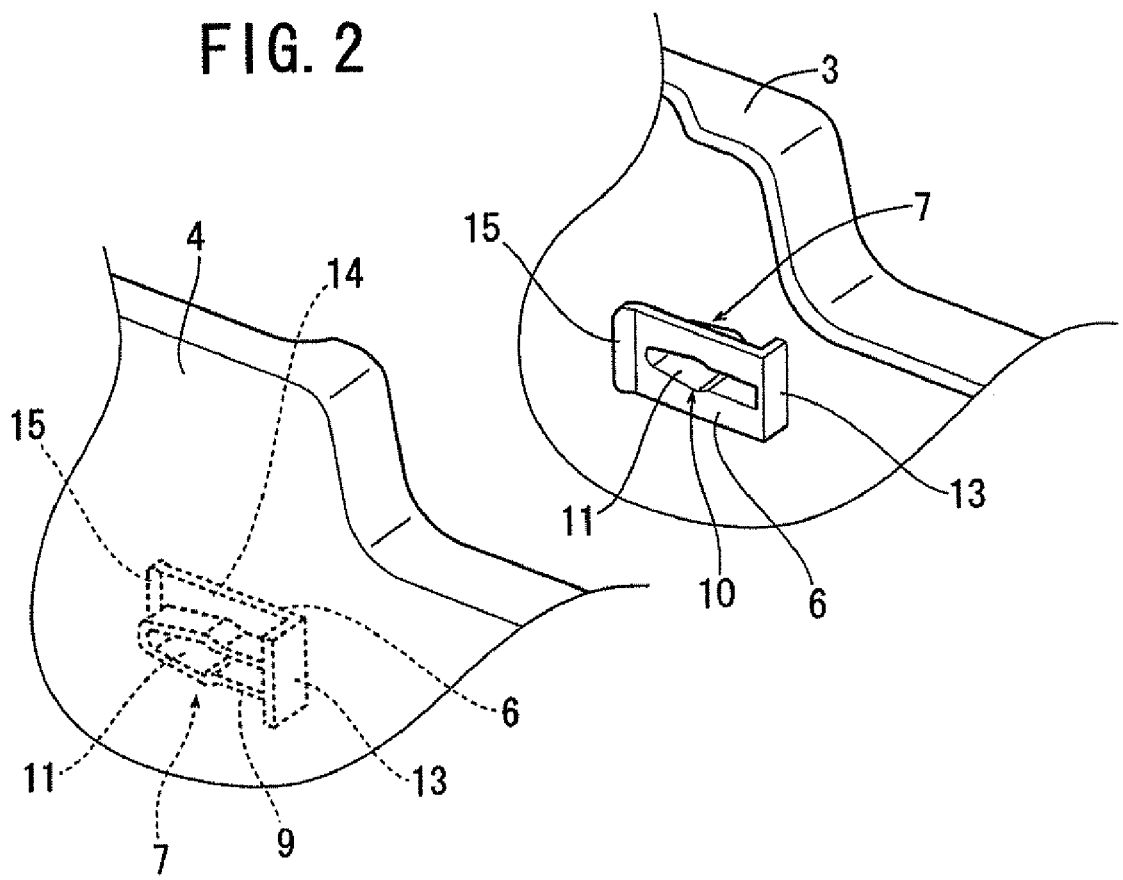
FIG. 2 is a fragmentary, perspective view showing left and right side panels of the console assembly shown in FIG. 1A.

Hereinafter, embodiments of the invention will be described by taking as an example a console assembly, which is to be disposed between a driver's seat and a front passenger's seat of a motor vehicle.

Embodiment 1

FIGS. 1 to 4 shows a first embodiment of the present invention. As is shown in FIG. 1A, a console assembly 1 is made up by connecting a right side panel 3 and a left side panel 4 to a console box 2 which is made to open at a top thereof. The box 2, the right side panel 3 and the left side panel 4 are integrally molded from a synthetic resin material, respectively. Four supporting portions 5 are formed integrally on each of left and right sides of the box 2. Four flange portions 6 are formed integrally on each of the left and right side panels 3, 4. These flange portions 6 are positioned in such a manner as to correspond to the supporting portions 5 on the box 2.

FIG. 1B shows a console assembly which is similar to that shown in FIG. 1A, and in FIG. 1B, constituent components given like reference numerals to those in FIG. 1A are constituent components having like designations. However, the console assembly 1 illustrated in FIG. 1B differs from that shown in FIG. 1A in that supporting portions 5 and flange portions 6 thereof are formed in a different direction. The supporting portion 5 in FIG. 1B is made into a form which results by rotating the supporting portion 5 in FIG. 1A through 90 degrees in a clockwise direction, and the flange portion 6 illustrated in FIG. 1B is made into a form which results by rotating the locking portion 6 in FIG. 1A through 90 degrees in a counterclockwise direction.

Due to those differences, the way of assembling the side panels to the box becomes different between the console assemblies shown in FIGS. 1A and 1B. Namely, in the console assembly 1 shown in FIG. 1A, the flange portions 6 are brought into engagement with the corresponding supporting portions 5 by moving the left and right side panels 3 and 4 in a longitudinal direction of each side panel relative to the box 2, whereas in the console assembly 1 shown in FIG. 1B, the supporting portions 5 and the flange portions 6 are brought into engagement with each other by moving the left and right side panels 3 and 4 in a downward direction in the figure relative to the box 2. The supporting portions 5 and the flange portions 6 in FIG. 1A and the supporting portions 5 and the flange portions 6 in FIG. 1B have the same configurations.

In both the console assemblies 1 in FIGS. 1A and 1B, interior surfaces $RS_2$ of the box 2 and exterior surfaces $RS_1$, of the left and right side panels 3, 4 constitute product surfaces. The exterior surfaces $RS_1$ of the left and right side panels 3, 4 mean surfaces opposite to surfaces thereof where the flange portions 6 are formed.

Figure 3:
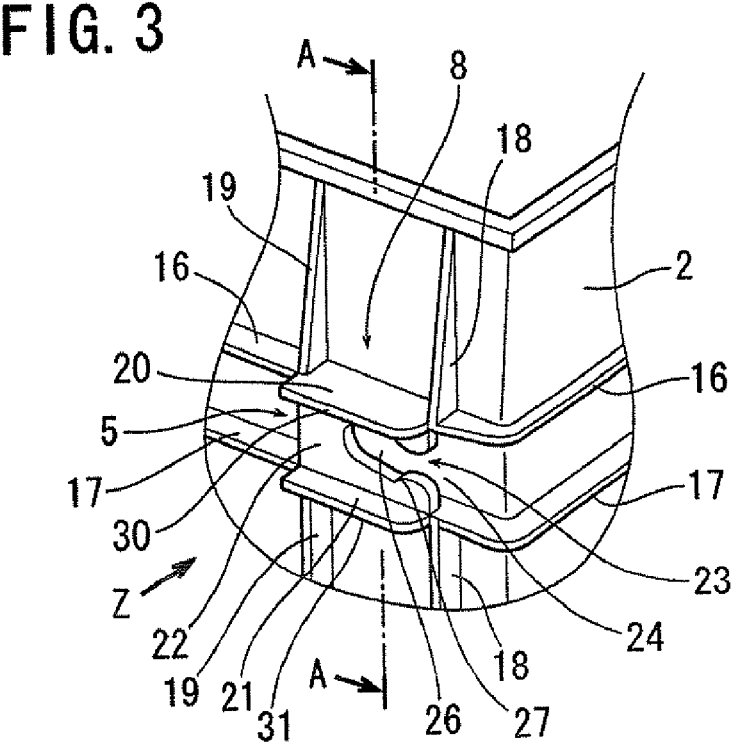
FIG. 3 is a fragmentary, perspective view of a console box of the console assembly shown in FIG. 1A.

As is shown in FIG. 1A or FIG. 1B, the four flange portions 6 are formed integrally on the rear surfaces of the left and right side panels 3, 4, respectively. In addition, the eight supporting portions 5 are formed on the exterior surfaces of the box 2 in such a manner as to correspond to the flange portions 6, respectively. As is shown in FIG. 2, the portions on the left and right side panels 3, 4 where the flange portions 6 are formed are made to constitute connecting portions 7, and as is shown in FIG. 3, the portions on the box 2 where the supporting portions 5 are formed are made to constitute connecting portions 8. The numbers of connecting portions 7 and 8 are arbitrary. Hereinafter, embodiments of the present invention will be described by taking as examples one of the connecting portions 7 formed on the left side panel 4 shown in FIG. 1A and one of the connecting portions 8 formed on the box 2 shown in FIG. 3. Including the modified example shown in FIG. 1B the configurations of the other connecting portions 7 and 8 are the same as the configurations of the connecting portions 7 and 8 which will be described below.

Figure 4A:
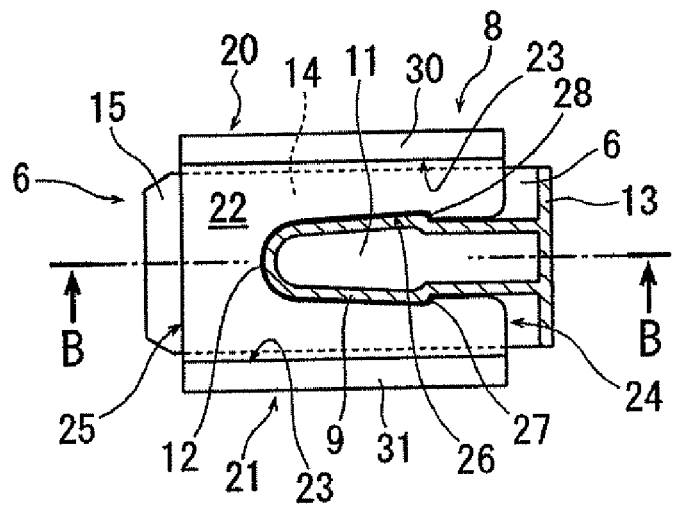
FIG. 4A is a plan view of the joining structure shown in FIGS. 2 and 3.

As is shown in FIG. 2, a hollow protruding portion 9 is formed integrally on the connecting portion 7 on the left side panel 4, and a plate-shaped locking portion 6 is formed integrally on an end face of the protruding portion 9 in such a manner as to be spaced apart a certain distance from the connecting portion 7. An opening 10 is formed in a central portion of the flange portion 6, and the opening 10 communicates with an interior space 11 of the protruding portion 9. As is shown in FIG. 4A, the hollow protruding portion 9 is formed substantially into the shape of U, which is the twenty-first letter of the alphabet in cross section, and a distal end portion thereof is formed into a smooth curved surface, whereas a rear end portion thereof is closed by a bend portion 13 of the plate-shaped locking portion 6 which is bent downwards. An abutting surface 14 is formed on a surface of surfaces of the plate-shaped locking portion 6 which faces a surface of the connecting portion 7. As is shown in FIGS. 2 and 4, the abutting surface 14 is formed on the perimeter of the protruding portion 9. In addition, the plate-shaped flange portion 6 has a distal bent portion 15 which is bent towards the box 2, and the bent portion 15 provides a guide surface for connecting the flange portion 6 to the supporting portion 5.

FIG. 3 shows a connecting portion 8 of the box 2 which is brought into engagement with the flange portion 6 and the protruding portion 9 of the connecting portion 7 on the left side panel 4. The connecting portion 8 is positioned where four reinforcement ribs 16, 17, 18, 19 intersect each other which are formed on an exterior surface of the box 2 in such a manner as to protrude therefrom. The supporting portion 5 formed at the connecting portion 8 has a pair of supporting ribs 20, 21 which are formed integrally on the reinforcement ribs 16, 17, respectively, and a supporting plate 22 is molded integrally between the supporting ribs 20, 21 in such a state that the supporting plate 22 bridges the supporting ribs 20, 21. A connecting groove 23 is formed between the supporting plate 22 and a surface of the connecting portion 8 of the box 2, and the connecting groove 23 extends between the supporting ribs 20, 21. An opening 24, into which the flange portion 6 is inserted, is formed at one end of the connecting groove 23, and an opening 25, from which the distal bent portion 15 of the flange portion 6 protrudes, is formed at the other end of the connecting groove 23.

An upper slot 26 is formed in the supporting plate 22 in such a manner as to receive therein the protruding portion 9 formed on the connecting portion 7 on the left side panel 4. The upper slot 26 is made to open to a side slot 24 on the side of the connecting groove 23 and extends along the connecting groove 23 in a direction in which the protruding portion 9 enters. As is shown in FIG. 4A, a step portion 27 is formed at an intermediate portion along the length of the upper slot 26 in such a manner that the step portion 27 so formed is brought into engagement with a shoulder portion 28 of the protruding portion 9 which has entered the upper slot 26 so as to prevent the dislodgement of the protruding portion 9 from the upper slot 26. Since the supporting ribs 20, 21 are formed integrally on the reinforcement ribs 16, 17, respectively, they each have a high rigidity, but since the protruding portion 9 is the hollow body having the opening 10, the protruding portion 9 can deform when entering the upper slot 26.

A bearing surface 29 is formed on a side of the supporting plate 22 which faces the connecting groove 23. The bearing surface 29 is situated on the perimeter of the upper slot 26. The bearing surface 29 is formed in such a position that the bearing surface 29 is allowed to be brought into engagement with the abutting surface 14 of the plate-shaped flange portion 6 when the connecting portion 7 on the left side panel 4 is connected to the connecting portion 8 on the box 2.

Extension ribs 30, 31 are formed at distal end portions of the supporting ribs 20, 21, respectively, in such a manner as to protrude therefrom. The extension ribs 30, 31 are brought into press contact with the connecting portion 7 or in the vicinity thereof on the left side panel 4 when the connecting portion 7 of the left side panel 4 is connected to the connecting portion 8 of the box 2, so as to function as a strut for interlocking the abutting surface 14 of the plate-shaped flange portion 6 to the bearing surface 29 of the supporting plate 22 under pressure. In addition, as is shown in FIG. 4C, the extension ribs 30, 31 each have a curved surface 32 which is inclined moderately towards the side slot 24 in the connecting groove 23. The curved surface 32 constitutes a guide surface when the plate-shaped flange portion 6 is inserted into the connecting groove 23.

Figure 4B:
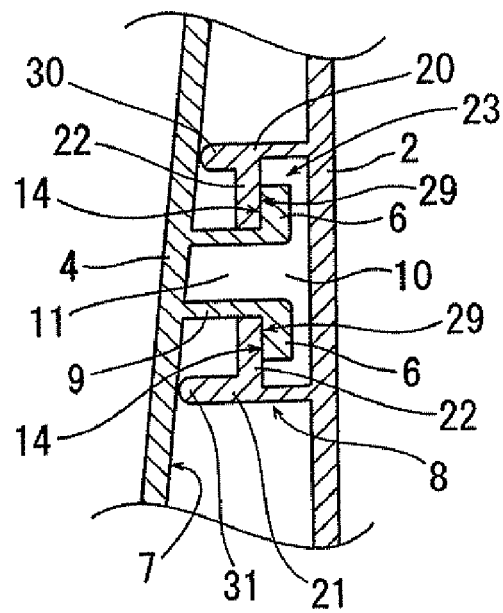
FIG. 4B is a sectional view taken along the line A-A in FIG. 3.
Figure 4C:
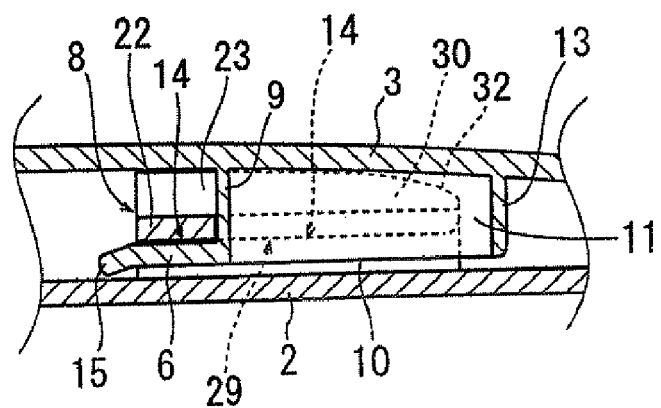
FIG. 4C is a sectional view taken along the line B-B in FIG. 4A.

In the embodiment shown in FIG. 1A, in order to connect the left side panel 4 to the box 2, the plate-shaped flange portion 6 formed at the connecting portion 7 on the left side panel 4 as shown in FIG. 2 is inserted into the connecting groove 23 formed at the connecting portion 8 on the box 2 shown in FIG. 3, and at the same time, the hollow protruding portion shown in FIG. 2 is pushed into a deepest portion of the upper slot 26 shown in FIG. 3, whereby as is shown in FIG. 4B, since the extension ribs 30, 31 of the box 2 are brought into press contact with the vicinity of the connecting portion 7 on the left side panel 4, so as to attempt to forcibly open a space between the left side panel 4 and the box 2, the abutting surface 14 of the plate-shaped flange portion 6 and the bearing surface 29 of the supporting plate 22 are interlocked with each other under pressure, whereby the position and posture of the panel 4 relative to the box 2 are maintained. In addition, as this occurs, the shoulder portion 28 of the protruding portion 9 is brought into engagement with the step portion 27 of the upper slot 26, so as to prevent the disengagement of the connection between the panel 4 and the box 2.

In addition, the connecting portions 7 and 8, which are provided four each, are connected to each other at the same time that the left side panel 4 is connected to the box 2. Namely, in the embodiment shown in FIG. 1A, the connection of the panel 4 and the box 2 is established only by performing an operation in which the panel 4 is caused to move in its longitudinal direction so that the four connecting portions 7 on the panel 4 are brought into engagement with the four connecting portions 8 on the box 2 simultaneously. A connection of the right side panel 3 to the box 2 will be effected in a similar manner. In addition, in the modified example shown in FIG. 1B, the left and right side panels 3, 4 are connected to the box 2, respectively, through operations in which the left and right side panels 3, 4 are caused to move downwards relative to the box 2. In this way, the connection of the left and right side panels 3, 4 to the box 2 is established, whereby the console assembly 1 is assembled completely.

Interior surfaces $RS_2$ of the box 2 and exterior surfaces $RS_1$ of the left and right side panels 3, 4 of the console assembly 1 can constitute product surfaces of the console assembly 1 as they are. Namely, the supporting portion 5 formed integrally on the connecting portion 8 of the box 2 constitutes a hollow body which is made to open to the outside by virtue of the existence of the connecting groove 23 having the side slot 24. In addition, the protruding portion 9 formed integrally on the connecting portion 7 of each of the left and right side panels 3, 4 constitutes a hollow body which is made to open to the outside by virtue of the existence of the interior space 11 having the opening 10. Due to this, even when the box 2 and the panels 3, 4 are formed from synthetic resin, an internal stress is made difficult to be produced when the synthetic resin molded bodies are cooled which stress would otherwise be produced at the portions where the hollow bodies are formed in association with the shrinkage of the synthetic resin material. Consequently, it is possible to prevent the generation of defects such as sink mark, deformation, cracking and the like on the interior surfaces $RS_2$ of the box 2 and the exterior surfaces $RS_1$ of the left and right side panels 3, 4. It is noted that an armrest which can be opened and closed (not shown) is mounted over an opening of the box 2.

Embodiment 2

Figure 5:
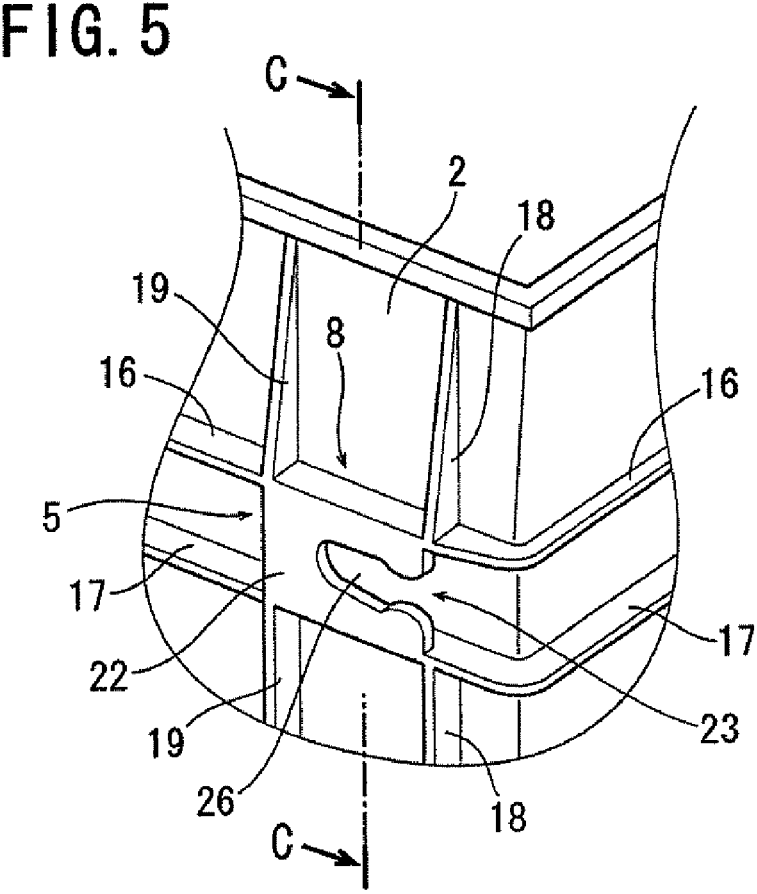
FIG. 5 is a fragmentary, perspective view of a console box shown as a second embodiment of the present invention.
Figure 6:
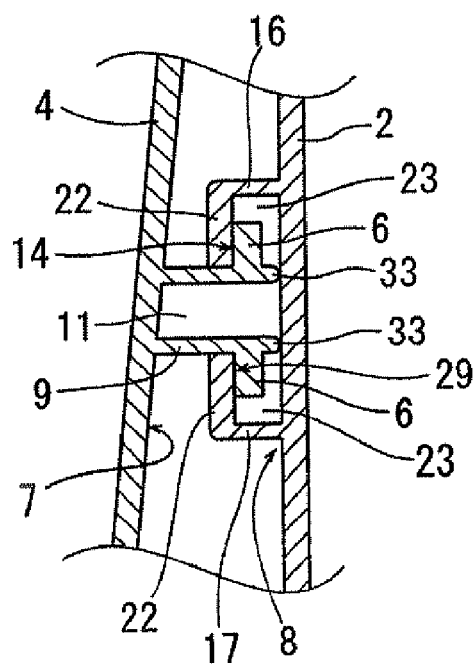
FIG. 6 is a sectional view taken along the line C-C in FIG. 5.
Figure 7:
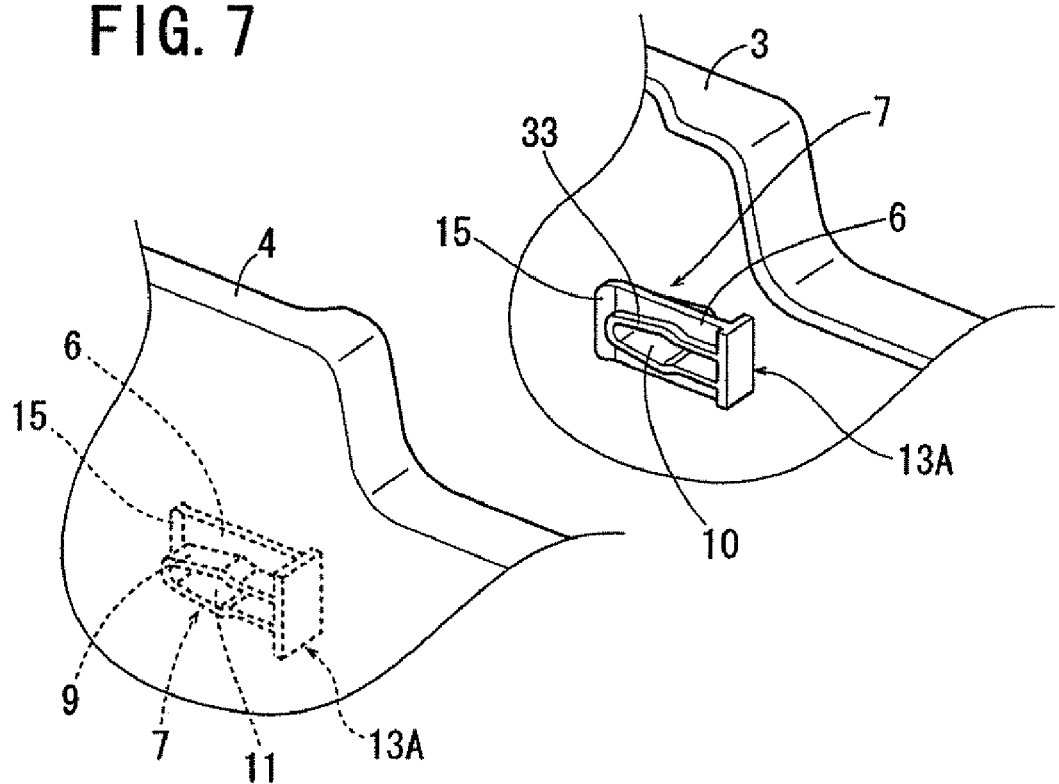
FIG. 7 is a fragmentary, perspective view of left and right side panels shown as a second embodiment of the present invention.

FIGS. 5 to 7 show a second embodiment of the invention. In FIGS. 5 to 7, same reference numerals to those used in FIGS. 1 to 4 denote constituent components having the same designations as those described in FIGS. 1 to 4. The features of this embodiment resides in a configuration in which in place of the extension ribs 30, 31 in the first embodiment, a ridge portion 33 is formed in such a manner as to surround an opening 10 in a plate-shaped flange portion 6 formed at a connecting portion 7 of each of left and right side panels 3, 4, and distal end portions of the ridge portion 33 are made to continuously contact a rear end bent portion 13A of the flange portion 6. Since the rear end bent portion 13A is connected to the ridge portion 33, the rear end bent portion 13A has a portion which protrudes further downwards from an opening 10 side surface of the flange portion 6 than the rear end bent portion 13 of the first embodiment. In addition, a supporting portion 5 formed at a connecting portion 8 of a box 2 has a supporting plate 22 which is formed integrally with reinforcement ribs 16, 17 in such a state that the supporting plate 22 bridges the reinforcement ribs 16, 17. A connecting groove 23 extends between the supporting plate 22 and a surface of the connecting portion 8. The other configurations are the same as those of the first embodiment.

As is shown in FIG. 6, when the plate-shaped flange portion 6 is inserted into the connecting groove 23, the ridge portion 33 is brought into press contact with a surface of the connecting portion of the box 2 so as to function as a strut, and an abutting surface 14 of the plate-shaped flange portion 6 and a bearing surface 29 of the supporting plate 22 are bonded to each other under pressure, whereby the position and posture of the panel 4 relative to the box 2 are maintained, so that the connecting strength between the box 2 and the left and right side panels 3, 4 can be increased. In addition, since no portion exists at the connecting portion 8 of the box 2 which protrudes further than the reinforcement ribs 16, 17, the storability of the box 2 can also be enhanced.

Embodiment 3

Figure 8:
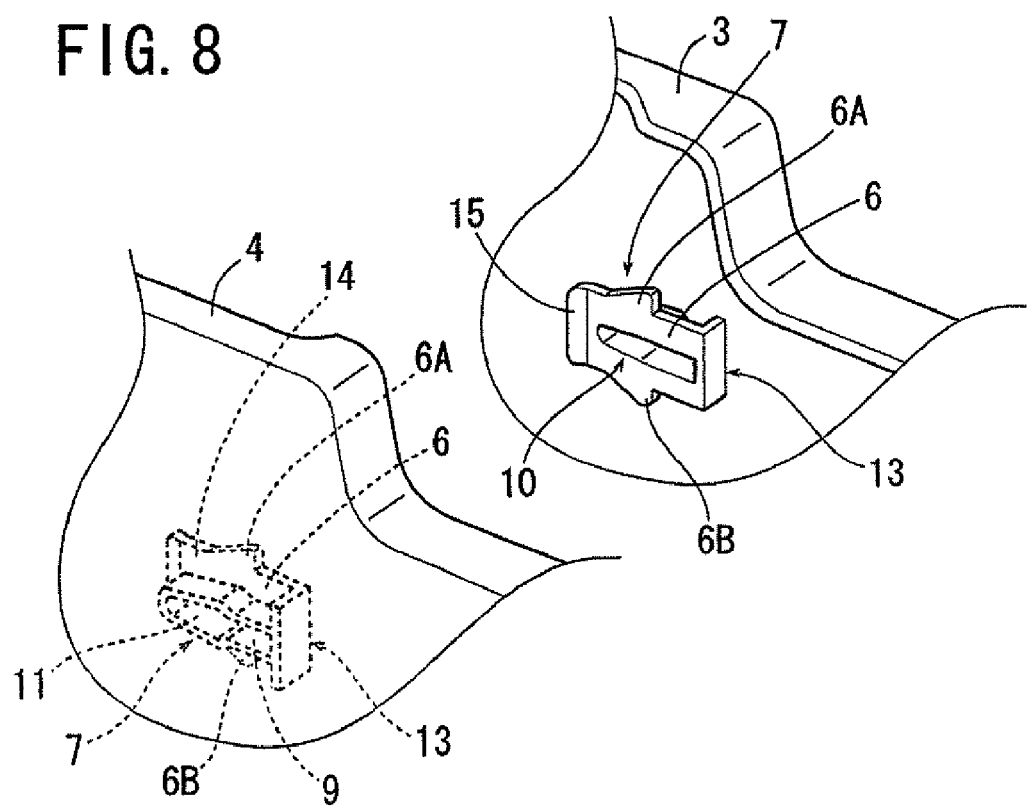
FIG. 8 is a fragmentary, perspective view of left and right side panels shown as a third embodiment of the present invention.
Figure 9:
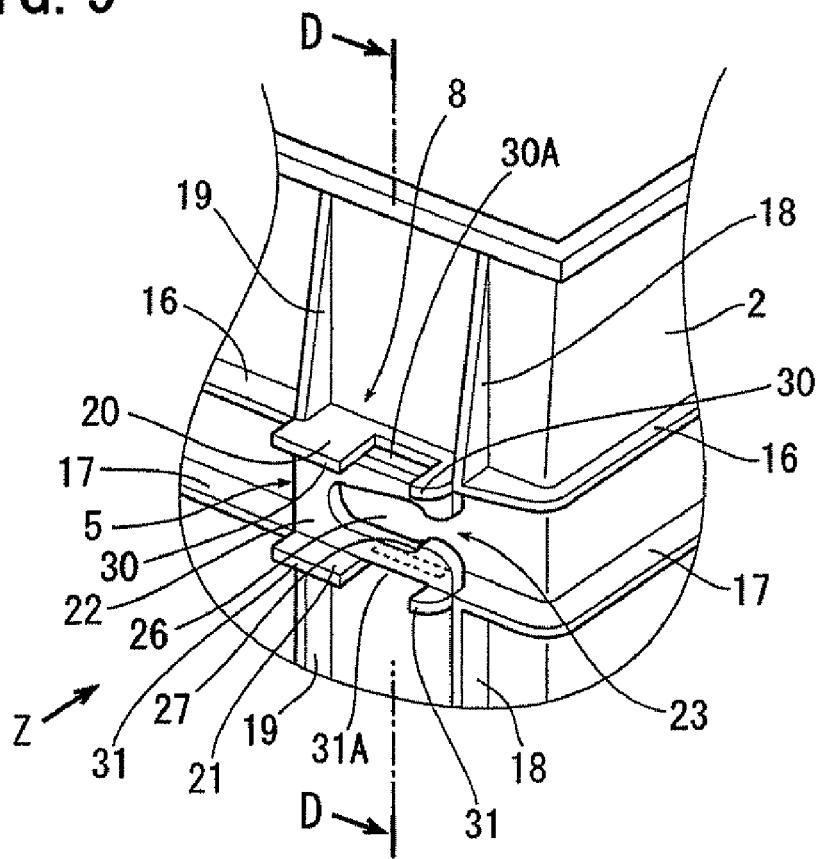
FIG. 9 is a fragmentary, perspective view of a console box shown as a third embodiment of the present invention.
Figure 10:
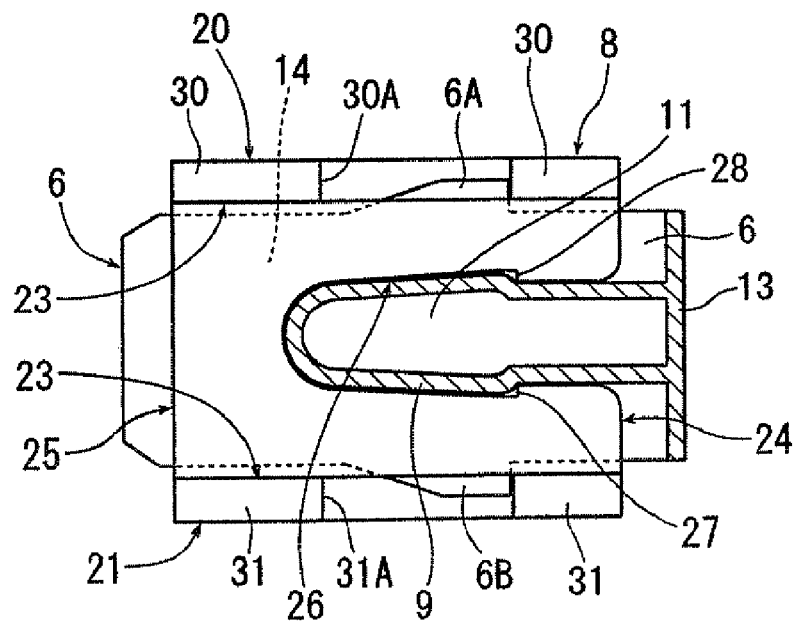
FIG. 10 is a plan view of the joining structure shown in FIGS. 8 and 9.
Figure 11:
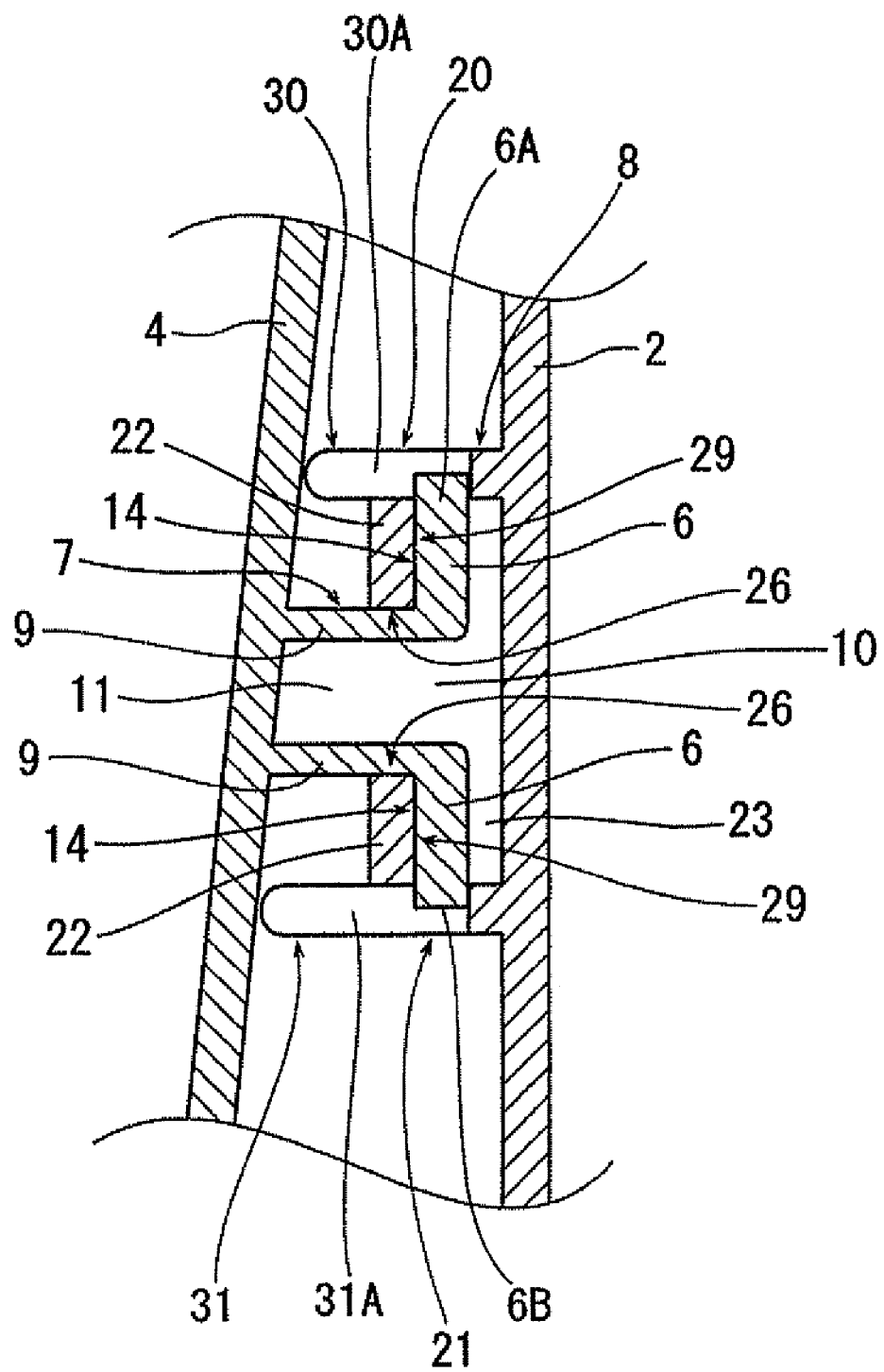
FIG. 11 is a sectional view taken along the line D-D in FIG. 9.

FIGS. 8 to 10 show a third embodiment. In FIGS. 8 to 10, same reference numerals to those used in FIGS. 1 to 4 denote constituent components having the same designations. The features of this embodiment resides in a configuration in which in place of the shoulder portion 28 of the protruding portion 9 and the step portion 27 of the upper slot 26, a pair of flange projections 6A, 6B are formed on a plate-shaped flange portion 6 and intermediate slots 30A, 31A are formed in supporting ribs 20, 21, respectively, in such a manner as to open to edge portions of extension ribs 30, 31, so that, when left and right side panels 3, 4 are connected to a box 2, the flange projections 6A, 6B are brought into engagement with the intermediate slots 30A, 31A, respectively, whereby connecting portions 7 of the left and right side panels 3, 4 can be prevented from being dislodged from connecting portions 8 of the box 2 in an ensured fashion. The other configurations are similar to those of the first embodiment.

It is noted that, while in the first to third embodiments, the protruding portion 9 is formed substantially into the shape of U, which is the twenty-first letter of the alphabet, in cross section, a projecting portion formed into the shape of an arbitrary alphabet letter, for example, H, M and the like, in cross section can be used in the connecting construction of the invention.

In addition, while in the first to third embodiments, the hollow protruding portions and flange portions are formed on the left and right side panels and the supporting portions are formed on the box, the supporting portions may be formed on the left and right side panels and the hollow protruding portions and flange portions may be formed on the box.

Furthermore, the interlocking structure of the third embodiment of the invention shown in FIGS. 8 to 10 which are made up of the flange projections 6A, 6B and the intermediate slots 30A, 31A can be formed on the joining structure of the second embodiment of the invention shown in FIGS. 5 to 7.

The present invention realizes a joining structure of component parts producing the aforementioned features and advantages, without diminishing moldability of the products to be integrally molded from synthetic resin.

It is noted that the joining structure of the present invention can be used not only when joining automotive interior parts but also when connecting other items to each other.

What is claimed is:
1. A joining structure of component parts comprising:
  a first component part having a hollow protruding portion projecting from a side surface of said first component part, a flange portion projecting from an outer periphery of said hollow protruding portion and leaving a space from a side of said first component part, and an abutting surface on said flange portion opposed to the side surface of said first component part;

a second component part having a connecting groove for receiving said flange portion, said connecting groove extending along a side surface of said second component part and comprising a side slot for inserting said flange portion into said connecting groove, an upper slot for receiving said hollow protruding portion, and a bearing surface for engaging said abutting surface; and at least one strut portion on at least one of said first and second component parts, wherein said at least one strut portion is compressed between said first and second component parts when said flange portion is inserted into said connecting groove so that said abutting surface and said bearing surface are clamped together by a force exerted by said at least one strut portion.

2. The joining structure as recited in claim 1, including at least one step portion in said upper slot, and at least one shoulder portion in an outer surface of said hollow protruding portion, wherein said hollow protruding portion is retained in said upper slot when said at least one shoulder portion engages said step portions.

3. The joining structure as recited in claim 1, wherein
said first component part, including said hollow protruding portion and said flange portion, is one piece and molded synthetic resin,
said hollow protruding portion is generally U-shaped in cross section and encloses an interior space of said hollow protruding portion,
an opening in the end surface of said hollow protruding portion communicates with said interior space, and
said flange portion extends into said opening and protrudes beyond said hollow protruding portion.

4. The joining structure as recited in claim 1, wherein
said connecting groove comprises a pair of supporting ribs on the side surface of said second component part and a supporting plate bridging said pair of supporting ribs,
said second component part, including said supporting ribs and said supporting plate, is one piece and molded synthetic resin,
said side slot is defined by end edges of said supporting ribs and end edges of said supporting plate and the side surface of said second component part,
said upper slot extends from said side slot to define a generally U-shaped groove in said supporting plate, and
said strut portion is composed of said supporting rib and an extension rib which is integral with and on said supporting rib and projects beyond said supporting plate toward the side surface of said first component part.

5. The joining structure as recited in claim 4, wherein said extension rib has a curved surface gradually slanting toward said side slot of said connecting groove.

6. The joining structure as recited in claim 4, wherein said supporting ribs are integrated with reinforcement ribs on a side of said second component part.

7. The joining structure as recited in claim 1, wherein
said first component part, including said hollow protruding portion and said flange portion, is one piece and molded synthetic resin,
said hollow protruding portion is approximately U-shaped in cross section and encloses an interior space of said hollow protruding portion,
an end surface of said hollow protruding portion includes an opening that communicates with said interior space,
said flange portion is located in a periphery of said opening,
said abutting surface protrudes beyond the outer periphery of said hollow protruding portion,
said flange portion includes a ridge portion extending along a peripheral border of said opening,
said ridge portion is projected onto the side surface of said second component part, and
said strut portion is composed of said hollow protruding portion and said ridge portion.

8. The joining structure as recited in claim 1, wherein
said connecting groove is defined by a pair of supporting ribs, a supporting plate bridging between said pair of supporting ribs, and the side surface of said second component part,
said second component part, including said pair of supporting ribs and said supporting plate, is one piece and molded synthetic resin,
said side slot of said connecting groove is defined by end edges of said supporting ribs, end edges of said supporting plate, and the side surface of said second component part, and
said upper slot extends from said side slot to define a generally U-shaped groove in said supporting plate.

9. The joining structure as recited in claim 1, wherein said first and second component parts are interior parts for vehicles.

10. The joining structure as recited in claim 2, wherein
said first component part, including said hollow protruding portion and said flange portion, is one piece and molded synthetic resin,
said hollow protruding portion is generally U-shaped in cross section and encloses an interior space of said hollow protruding portion,
an opening in the end surface of said hollow protruding portion communicates with said interior space, and
said flange portion extends into said opening and protrudes beyond said hollow protruding portion.

11. The joining structure as recited in claim 2, wherein
said connecting groove comprises a pair of supporting ribs on the side surface of said second component part and a supporting plate bridging said pair of supporting ribs,
said second component part, including said supporting ribs and said supporting plate, is one piece and integrally molded synthetic resin,
said side slot is defined by end edges of said supporting ribs and end edges of said supporting plate and the side surface of said second component part,
said upper slot extends from said side slot to define a generally U-shaped groove in said supporting plate, and
said strut portion is composed of said supporting rib and an extension rib which is integral with and on said supporting rib and projects beyond said supporting plate toward the side surface of said first component part.

12. The joining structure as recited in claim 11, wherein said extension rib has a curved surface gradually slanting toward said side slot of said connecting groove.

13. The joining structure as recited in claim 11, wherein said supporting ribs are integrated with reinforcement ribs on a side of said second component part.

14. The joining structure as recited in claim 2, wherein
said first component part, including said hollow protruding portion and said flange portion, is one piece and molded synthetic resin,
said hollow protruding portion is approximately U-shaped in cross section and encloses an interior space of said hollow protruding portion,
an end surface of said hollow protruding portion includes an opening that communicates with said interior space, said flange portion is located in a periphery of said opening, said abutting surface protrudes beyond the outer periphery of said hollow protruding portion, said flange portion includes a ridge portion extending along a peripheral border of said opening, said ridge portion is projected onto the side surface of said second component part, and said strut portion is composed of said hollow protruding portion and said ridge portion.

15. The joining structure as recited in claim 1, further comprising at least one flange projection on side edges of said flange portion, wherein said second component part includes at least one intermediate slot for receiving said at least one flange projection.

16. The joining structure as recited in claim 15, including at least one step portion in said upper slot, and at least one shoulder portion in an outer surface of said hollow protruding portion, wherein said hollow protruding portion is retained in said upper slot when said at least one shoulder portion engages said at least one step portion.

17. The joining structure as recited in claim 15, wherein said first component part, including said hollow protruding portion, said flange portion, and said at least one flange projection, is one piece and molded synthetic resin, said hollow protruding portion is generally U-shaped in cross section and encloses an interior space of said hollow protruding portion, an opening in an end surface of said hollow protruding portion communicates with said interior space, said flange portion extends in a periphery of said opening and protrudes beyond an outer surface of said hollow protruding portion, and said at least one flange projection protrudes from side edges of said flange portion.

18. The joining structure as recited in claim 15, wherein said connecting groove comprises a pair of supporting ribs on the side surface of said second component part and a supporting plate bridging said pair of supporting ribs, said second component part, including said supporting ribs and said supporting plate, is one piece and molded synthetic resin, said side slot is defined by end edges of said supporting ribs and end edges of said supporting plate and the side surface of said second component part, said upper slot extends from said side slot to define a generally U-shaped groove in said supporting plate, said strut portion is composed of said supporting rib and an extension rib which is integral with and on said supporting rib and projects beyond said supporting plate toward the side surface of said first component part, and said at least one intermediate slot opens into said connecting groove.

19. The joining structure as recited in claim 18, wherein said extension rib has a curved surface gradually slanting toward said side slot of said connecting groove.

20. The joining structure as recited in claim 18, wherein said supporting ribs are integrated with reinforcement ribs located on a side of said second component part.

21. The joining structure as recited in claim 16, wherein said connecting groove is defined by a pair of supporting ribs, a supporting plate bridging between said pair of supporting ribs, and the side surface of said second component part, said second component part, including said pair of supporting ribs and said supporting plate, is one piece and molded synthetic resin, said side slot of said connecting groove is defined by end edges of said supporting ribs, end edges of said supporting plate, and the side surface of said second component part, and said upper slot extends from said side slot to define a generally U-shaped groove in said supporting plate.

22. The joining structure as recited in claim 16, wherein said first component part, including said hollow protruding portion, said flange portion, and said at least one flange projection, is one piece and molded synthetic resin, said hollow protruding portion is generally U-shaped in cross section and encloses an interior space of said hollow protruding portion, an opening in an end surface of said hollow protruding portion communicates with said interior space, said flange portion extends in a periphery of said opening and protrudes beyond an outer surface of said hollow protruding portion, and said at least one flange projection protrudes from side edges of said flange portion.

23. The joining structure as recited in claim 16, wherein said connecting groove comprises a pair of supporting ribs on the side surface of said second component part and a supporting plate bridging said pair of supporting ribs, said second component part, including said supporting ribs and said supporting plate, is one piece and molded synthetic resin, said side slot is defined by end edges of said supporting ribs and end edges of said supporting plate and the side surface of said second component part, said upper slot extends from said side slot to define a generally U-shaped groove in said supporting plate, said strut portion is composed of said supporting rib and an extension rib which is integral with and on said supporting rib and projects beyond said supporting plate toward the side surface of said first component part, and said at least one intermediate slot opens into said connecting groove.

24. The joining structure as recited in claim 23, wherein said extension rib has a curved surface gradually slanting toward said side slot of said connecting groove.

25. The joining structure as recited in claim 23, wherein said supporting ribs are integrated with reinforcement ribs located on a side of said second component part.

26. The joining structure as recited in claim 15, wherein said first and second component parts are interior parts for vehicles.

* * * * *